(12) United States Patent
Wong et al.

(10) Patent No.: US 8,813,728 B2
(45) Date of Patent: Aug. 26, 2014

(54) INTAKE SYSTEM FOR AN INTERNAL COMBUSTION ENGINE

(75) Inventors: Kevin C. Wong, Ann Arbor, MI (US); Sameer Ogale, Rochester Hills, MI (US); Christopher K. Clarke, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 455 days.

(21) Appl. No.: 12/983,548

(22) Filed: Jan. 3, 2011

(65) Prior Publication Data

US 2012/0167860 A1 Jul. 5, 2012

(51) Int. Cl.
*F02B 29/04* (2006.01)

(52) U.S. Cl.
CPC ......... *F02B 29/0412* (2013.01); *F02B 29/0462* (2013.01); *F02B 29/0437* (2013.01)
USPC ................. 123/542; 123/184.24; 123/184.47; 123/556; 123/184.21

(58) Field of Classification Search
CPC .. F02B 29/0418; F02B 29/0462; F02B 29/04; F02B 29/02; F02B 29/045; F02B 29/0475; F02B 29/0412; F02B 29/0437; F02M 35/10373; F02M 19/06; F02M 31/04; F02M 35/104; F02D 41/144; Y02T 10/108; Y02T 10/146
USPC .......................... 123/184.21, 184.47, 542, 556
See application file for complete search history.

(56) References Cited

U.S. PATENT DOCUMENTS

| | | | | |
|---|---|---|---|---|
| 2,720,197 A | * | 10/1955 | Titns | 123/546 |
| 4,104,999 A | * | 8/1978 | Ullrich | 123/563 |
| 4,207,848 A | * | 6/1980 | Dinger et al. | 123/556 |
| 6,167,855 B1 | * | 1/2001 | Mammarella et al. | 123/90.38 |
| 6,805,088 B2 | * | 10/2004 | Tachibana et al. | 123/184.47 |

FOREIGN PATENT DOCUMENTS

| | | |
|---|---|---|
| DE | 19853455 A1 | 6/1999 |
| JP | 2005351220 | 12/2005 |
| WO | 2005116415 A1 | 12/2005 |

OTHER PUBLICATIONS

Office Action regarding related CN App. No. 201210030681.7; dated Jan. 6, 2014; 5 pgs.

* cited by examiner

*Primary Examiner* — Lindsay Low
*Assistant Examiner* — Kevin Lathers
(74) *Attorney, Agent, or Firm* — Cantor Colburn LLP

(57) ABSTRACT

The intake system includes an integrated airflow cooler module comprising a lower manifold assembly and a throttle body fluidly connected to, and disposed within the lower manifold assembly to meter combustion air into a lower manifold volume of the lower manifold assembly. An upper manifold assembly is configured for assembly to the lower manifold assembly to define a manifold volume therebetween and a heat exchanger is disposed in the manifold volume, between the upper manifold assembly and the lower manifold assembly and between a combustion air inlet in the integrated airflow cooler module and the throttle body.

16 Claims, 5 Drawing Sheets

INTAKE SYSTEM FOR AN INTERNAL COMBUSTION ENGINE

FIELD OF THE INVENTION

Exemplary embodiments of the present invention relate to combustion air intake systems for internal combustion engines and, more particularly, to an intake manifold module incorporating a throttle body, an intake charge cooler, and a manifold.

BACKGROUND

Internal combustion engines utilizing charge air compression are typically comprised of one or more exhaust driven turbochargers or an engine driven supercharger to deliver compressed combustion or charge air to the intake manifold. In the case of a dual turbocharger engine configuration, ducts from the turbochargers may combine the compressed combustion air and pass the charge through a charge air cooler. A duct extending from the outlet of the charge air cooler delivers cooled, compressed charge air to a throttle body that is mounted externally to a traditional intake manifold.

The charge air cooler is typically mounted in the under hood area of the vehicle near the coolant radiator and the air conditioner condenser coil (i.e. near the front of the vehicle) which result in air ducts to and from the charge air cooler that are long and subject to packaging, noise and vibration issues. Seals between the ducts and the various components present opportunities for leakage and the length of the ducts can have a deleterious effect on transient performance of the internal combustion engine. Additionally, the ducts from the turbocharger to the charge air cooler, and the ducts returning from the charge air cooler to the throttle body contain a significant air volume that must also be compressed during boosted operation. The additional volume delays the pressure build of the charge air entering the engine's cylinders contributing to what is commonly referred to as "turbo lag".

SUMMARY OF THE INVENTION

In an exemplary embodiment an air intake system for delivering combustion air to a cylinder head of an internal combustion engine includes an integrated airflow cooler module comprising a lower manifold assembly mounted to the cylinder head and an upper manifold assembly mounted to the lower manifold assembly to define a manifold volume therebetween. A throttle body is disposed within the manifold volume and is operable to section the manifold volume into an upper manifold volume and a lower manifold volume. A throttle blade disposed in the throttle body meters combustion air through the integrated airflow cooler module from the upper manifold volume to the lower manifold volume. A heat exchanger is disposed in the upper manifold volume between a combustion air inlet of the integrated airflow cooler module and the throttle body, wherein a combustion air flow path extends from the combustion air inlet, through the heat exchanger and the throttle body and to the cylinder head of the internal combustion engine.

In another exemplary embodiment, an integrated airflow cooler module for supplying combustion air to a cylinder head of an internal combustion engine comprises a lower manifold assembly mounted to the cylinder head and an upper manifold assembly configured for assembly to the lower manifold assembly to define a manifold volume therebetween. A throttle body is fluidly disposed within the manifold volume and is operable to section the manifold volume into an upper manifold volume and a lower manifold volume. A throttle blade disposed in the throttle body meters combustion air through the integrated airflow cooler module from the upper manifold volume to the lower manifold volume and to intake ports of the cylinder head. First and second heat exchangers are sealingly disposed in the upper manifold volume between the upper manifold assembly and the lower manifold assembly. First and second combustion air inlets are in fluid communication with first and second plenums adjacent to upstream faces of the first and second heat exchangers, wherein a combustion air flow path extends from the first and second combustion air inlets, through the first and second heat exchangers and the throttle body, and to the cylinder head of the internal combustion engine.

In yet another exemplary embodiment an integrated airflow cooler module for supplying combustion air to a cylinder head of an internal combustion engine comprises a lower manifold assembly mounted to the cylinder head, an upper manifold assembly mounted to the lower manifold assembly to define a manifold volume therebetween and first and second combustion air inlets. A throttle body is fluidly disposed within the manifold volume and is operable to section the manifold volume into an upper manifold volume and a lower manifold volume. A throttle blade disposed in the throttle body meters combustion air flowing through the integrated airflow cooler module from the first and second inlets to the cylinder head. First and second water-to-air heat exchangers, in fluid communication with a cooling system through a water manifold, are disposed in the upper manifold volume between the first and second combustion air inlets and the throttle body. Seals are disposed between the first and second heat exchangers and the inner walls of the upper manifold assembly and the lower manifold assembly to prevent hot combustion air entering the integrated airflow cooler module from bypassing the heat exchangers and entering the throttle body. A combustion air flow path extends from the first and second combustion air inlets, through the heat exchangers and the throttle body, and to the cylinder head.

The above features and advantages, and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
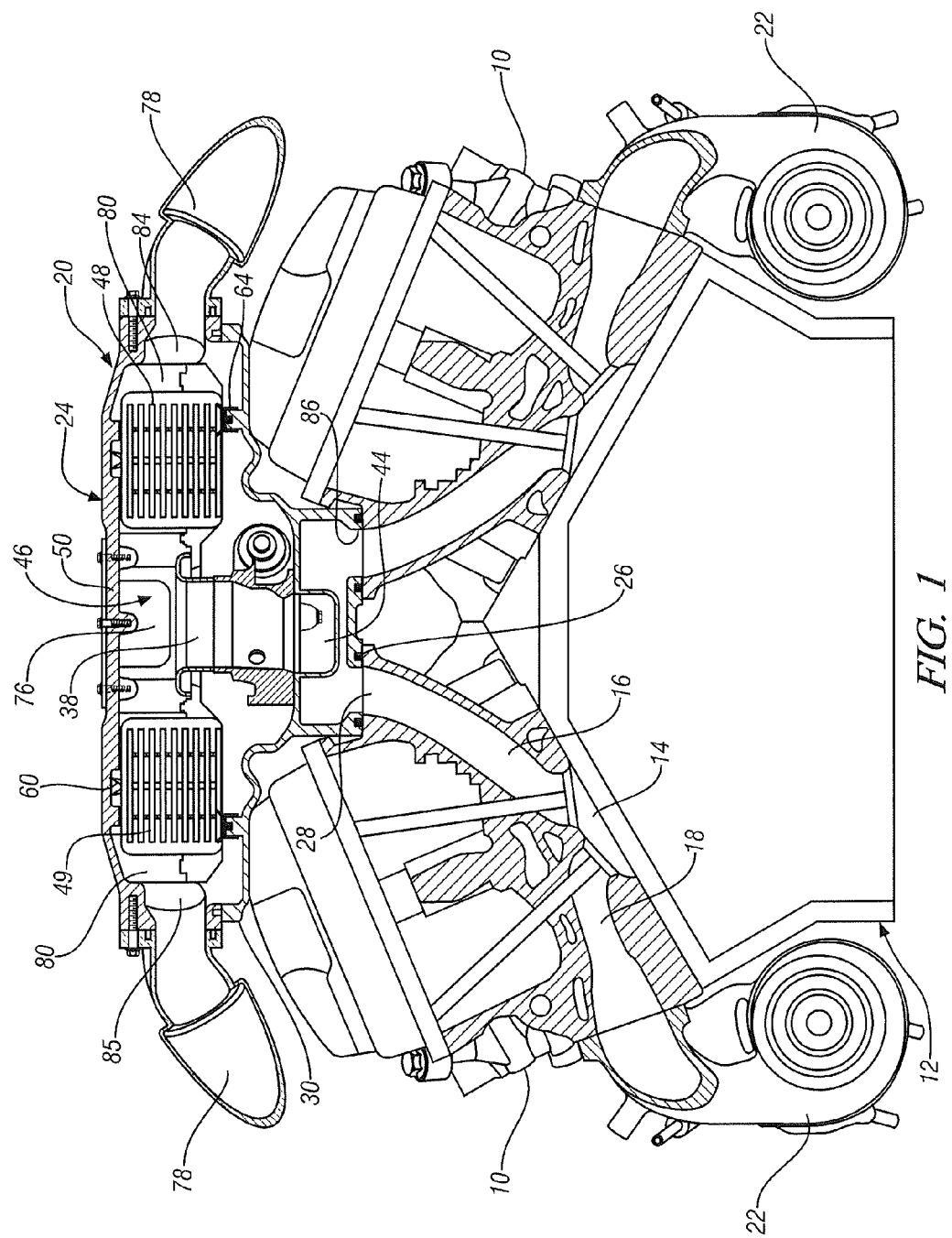
FIG. 1 is a partial sectional view of an internal combustion engine embodying features of the present invention.

The following description is merely exemplary in nature and is not intended to limit the present disclosure, application or uses. It should be understood that throughout the drawings, corresponding reference numerals indicate like or corresponding parts and features.

Referring now to FIG. 1, in an exemplary embodiment, one or more cylinder heads 10 of an internal combustion engine 12 include(s) a plurality of combustion chambers 14 in fluid communication with valved intake ports 16 and exhaust ports 18. The valved intake ports 16 receive combustion air from an air intake system 20 and deliver the intake air to the combustion chambers for mixing with fuel and combustion therein. Products of the combusted air and fuel (i.e. exhaust gas) exit the valved exhaust ports 18 and flow through exhaust driven turbochargers 22 that extract energy from the exhaust gas and utilize it to compress combustion air for delivery to the air intake system 20.

Figure 2:
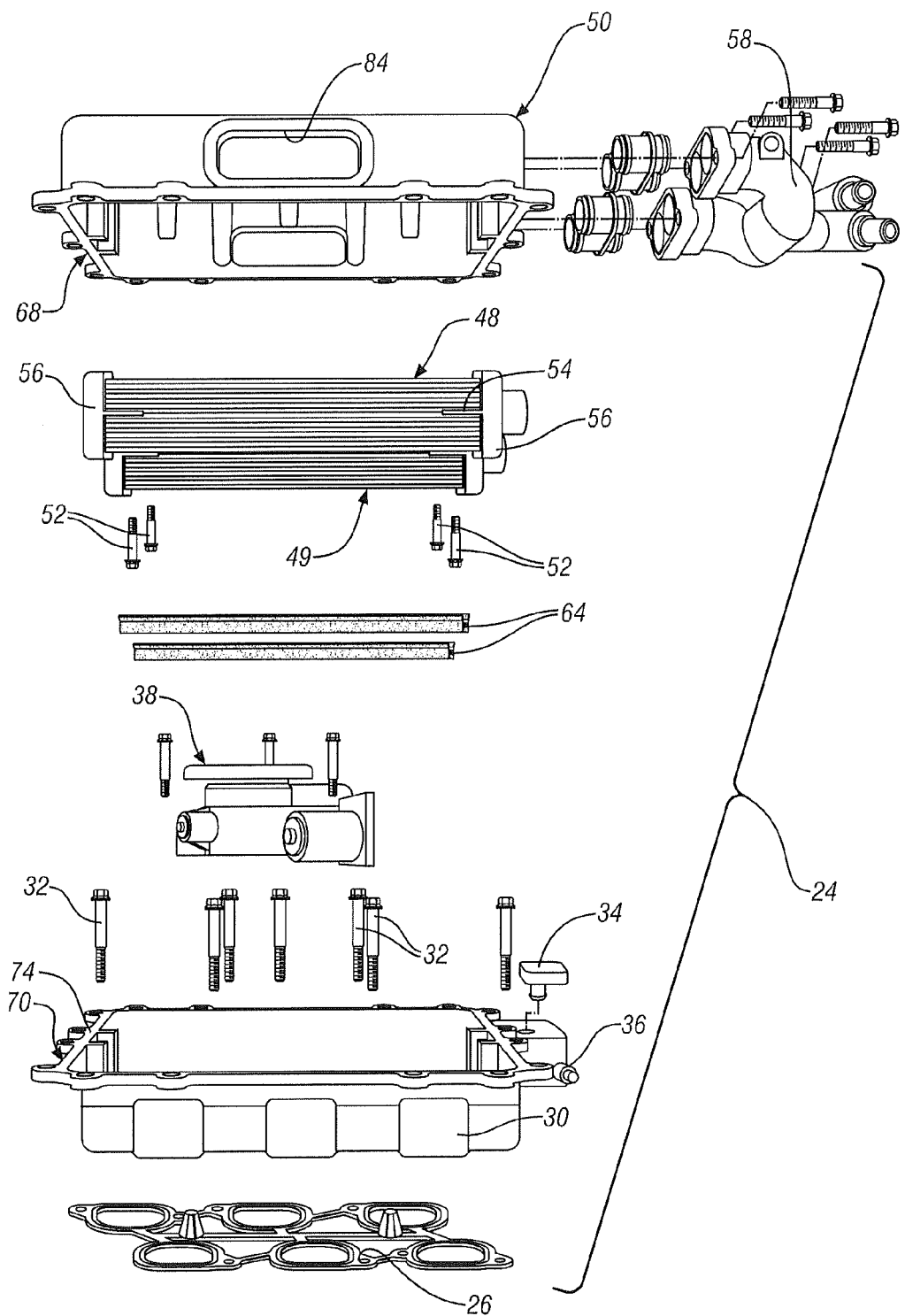
FIG. 2 is a side view of a partially disassembled integrated airflow cooler module embodying features of the present invention.
Figure 3:
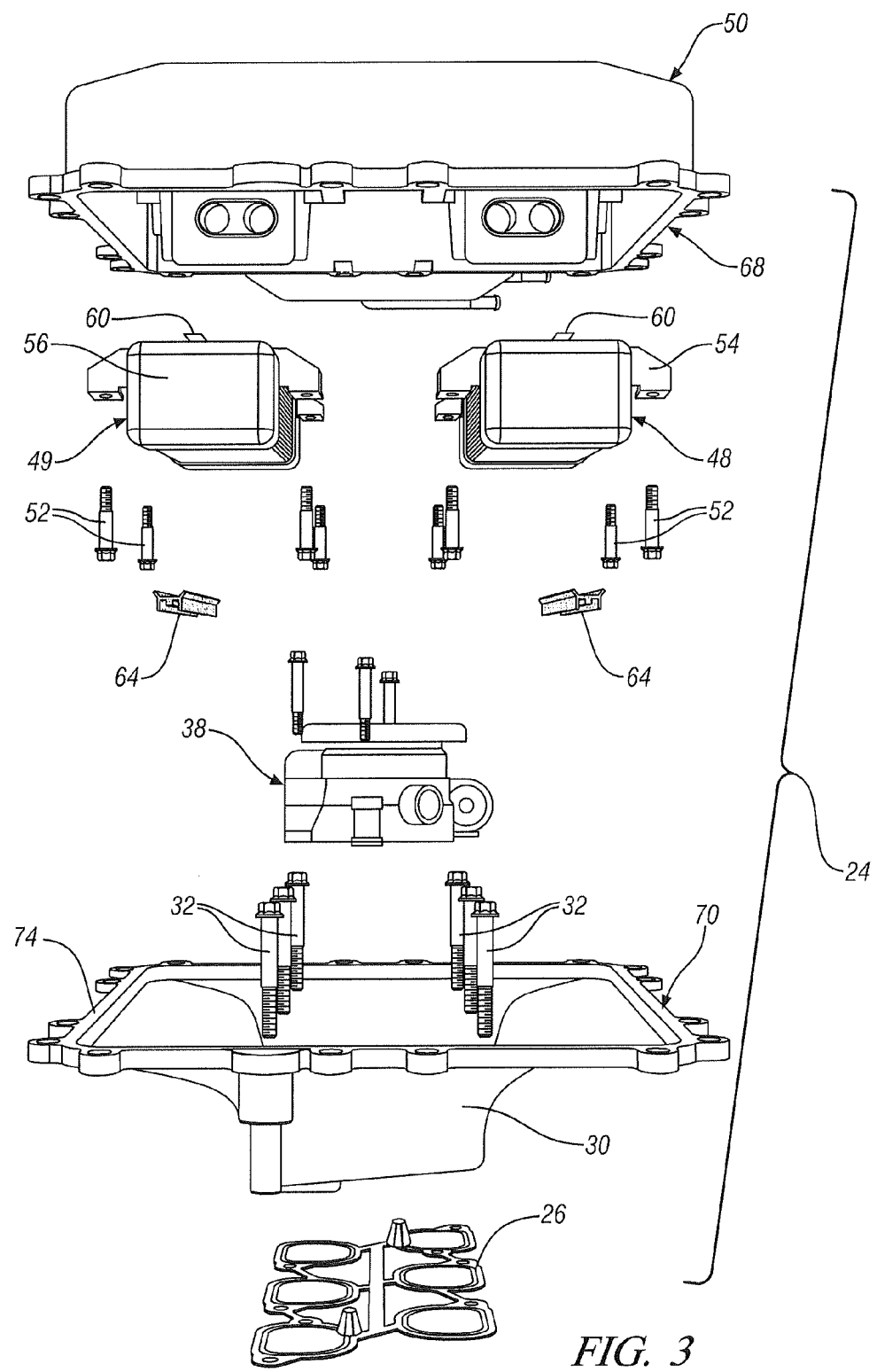
FIG. 3 is an end view of the partially disassembled integrated airflow cooler module of FIG. 2.

Referring to FIGS. 1, 2 and 3, in an exemplary embodiment the air intake system 20 comprises an integrated airflow cooler module ("IACM") 24 that is mounted to the cylinder head 10 of the internal combustion engine 12. The IACM 24 seals to the cylinder head 10 utilizing a gasket 26 that is disposed between the port openings 28 of the valved intake ports 16 of cylinder head 10 and combustion air outlets 86 of a lower manifold assembly 30, FIG. 4, of the IACM 24. The lower manifold assembly 30 is mounted to the cylinder head 10 using a plurality of bolts 32, FIG. 4, or other suitable fasteners. The gasket 26 and the bolt clamp load define a positive seal between the port openings 28 of the cylinder head 10 and the combustion air outlets 86 of the lower manifold assembly 30. The lower manifold assembly 30 may include provision for the mounting of a manifold absolute pressure ("MAP") sensor 34 as well as a port 36 for receiving a positive crankcase ventilation ("PCV") system conduit (not shown). An upper manifold assembly 50 is mounted to, and closes, the lower manifold assembly 30 to define a manifold volume 46. The upper manifold assembly 50 and the lower manifold assembly 30 are configured for assembly in a sealing relationship along perimeter flanges 68 and 70 through the use of bolts (not shown) or other suitable fasteners for holding the two assemblies together in a sealed relationship. A gasket 74 shown on the surface of flange 70 may be disposed between the perimeter flanges 68 and 70 to assure that a fluid tight seal is established therebetween.

As shown in FIGS. 1-4, a throttle body 38 is disposed within the manifold volume 46. The throttle body 38 operates to section the manifold volume into an upper manifold volume 76 and a lower manifold volume 44 and includes a throttle blade 39 disposed therein, that meters combustion air through the IACM 24 and to the intake ports 16 of the cylinder head 10. In the embodiment illustrated in the Figures, the throttle body 38 is disposed within the lower manifold assembly 30 and may include an integral gasket (not shown) to seal the downstream throttle bore 42 of the throttle body 38 thereto. The seal (not shown) is effective to avoid unmetered combustion air leaks around the throttle body 38 and throttle blade 39 that would allow combustion air to flow from the upper manifold volume 76 to the lower manifold volume 44 (i.e. around the throttled portion of the air intake system 20).

In an exemplary embodiment, first and second heat exchangers 48 and 49, respectively, are disposed within the upper manifold volume 76. In the exemplary embodiment illustrated in the Figures, the heat exchangers 48, 49 are assembled to the upper manifold assembly 50 using bolts 52 or other suitable fasteners that extend through brackets 54 that are integral with end plates or headers 56. The heat exchangers 48, 49 may comprise air-to-air exchangers or, as illustrated in the Figures, water-to-air heat exchangers that are in fluid communication with a cooling system (not shown) through water manifold 58, FIG. 2. In another exemplary embodiment not shown) the heat exchangers 48, 49 may be fastened to the lower manifold assembly 30 in a similar manner. Seals 60 are disposed between the heat exchangers 48, 49 and the inner wall 62 of the upper manifold assembly 50. In a similar fashion, seals 64 are disposed between the heat exchangers 48, 49 and the inner wall 66 of the lower manifold assembly 30. The seals 60 and 64 prevent hot combustion air "H", FIG. 4, entering the IACM 24 from bypassing the heat exchangers 48, 49 and entering the throttle body 38 without first being cooled.

As described above, the first and second heat exchangers 48, 49 and the throttle body 38 are internalized within the manifold volume 46 of the IACM 24 with the effect that the throttle blade 39 of the throttle body 38 separates the upper manifold volume 76 from the lower manifold volume 44. Specifically, a combustion air flow path 82, FIG. 4, is defined between first and second combustion air inlets 84, through the heat exchangers 48, 49 the throttle body 38 and to the cylinder head 10 of the internal combustion engine 12.

Figure 4:
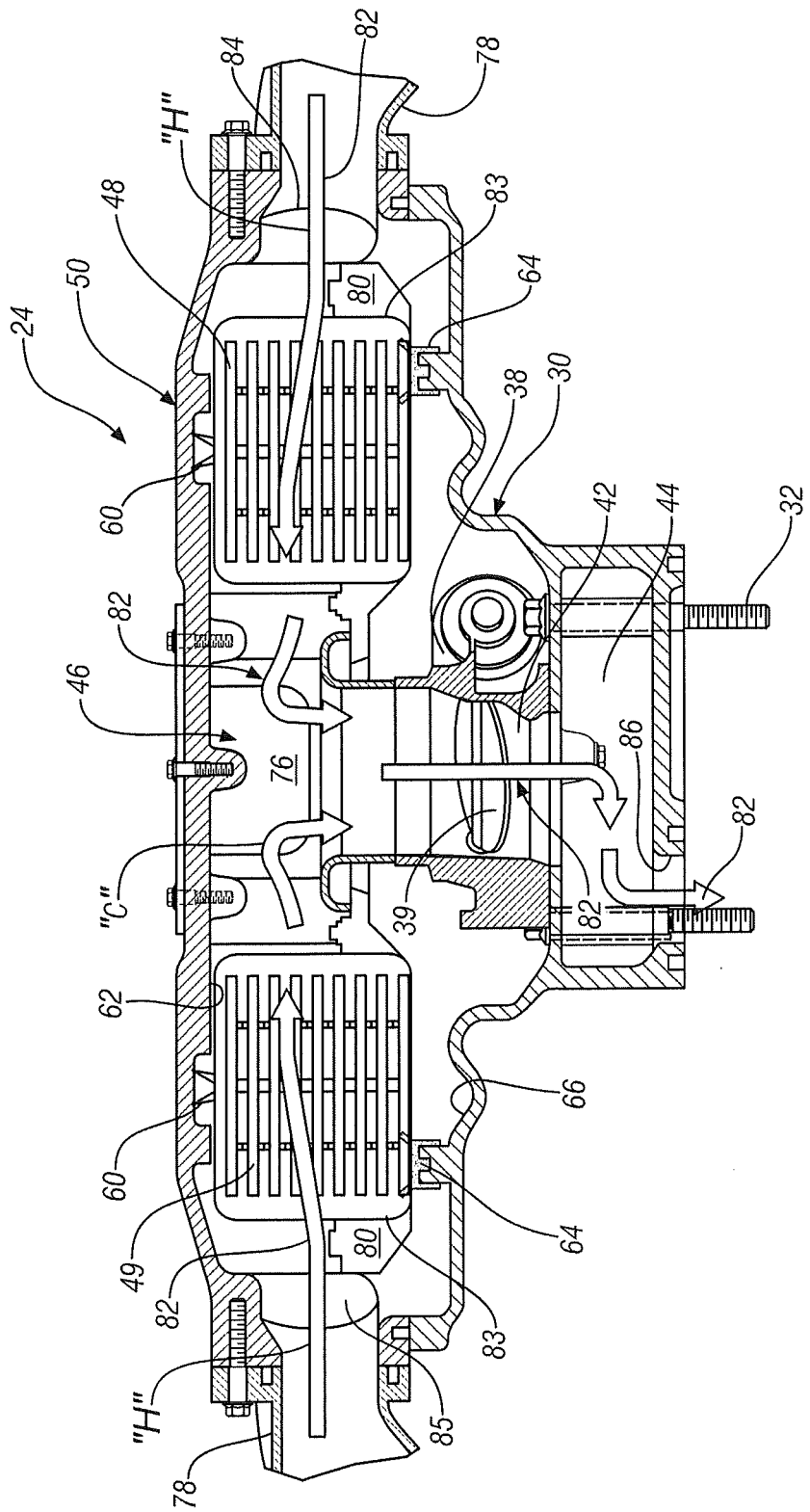
FIG. 4 is an enlarged sectional view of the integrated airflow cooler module of FIG. 2.

Referring in particular to FIGS. 1 and 4, in an exemplary embodiment, during operation of the internal combustion engine 12, hot compressed combustion air "H" from the exhaust driven turbochargers 22 enters first and second combustion air inlets 84, 85 of the IACM 24 via combustion air conduits 78. The combustion air inlets 84, 85 are in fluid communication with outer chambers or plenums 80, defined upstream of the heat exchangers 48, 49 that operate to receive the hot compressed combustion air "H". The hot compressed combustion air "H" is distributed within the plenums 80, across the upstream faces 83 of the heat exchangers 48, 49 thereby increasing the volume utilization of the exchangers; benefiting system efficiency and maximizing the removal of excess heat from the hot compressed combustion air "H".

Hot compressed combustion air "H" flows from the plenums 80 through the heat exchangers 48, 49 where it is cooled, in a known manner, before entering and combining into a unified combustion air flow 82 in the upper manifold volume 76 as cooled compressed combustion air "C". The cooled compressed combustion air "C" is metered by the throttle blade 39 of the throttle body 38 as it flows from the upper manifold volume 76 to the lower manifold volume 44 where it exits the IACM 24, through combustion air outlets 86, and enters the valved intake ports 16 of the internal combustion engine 12.

Figure 5:
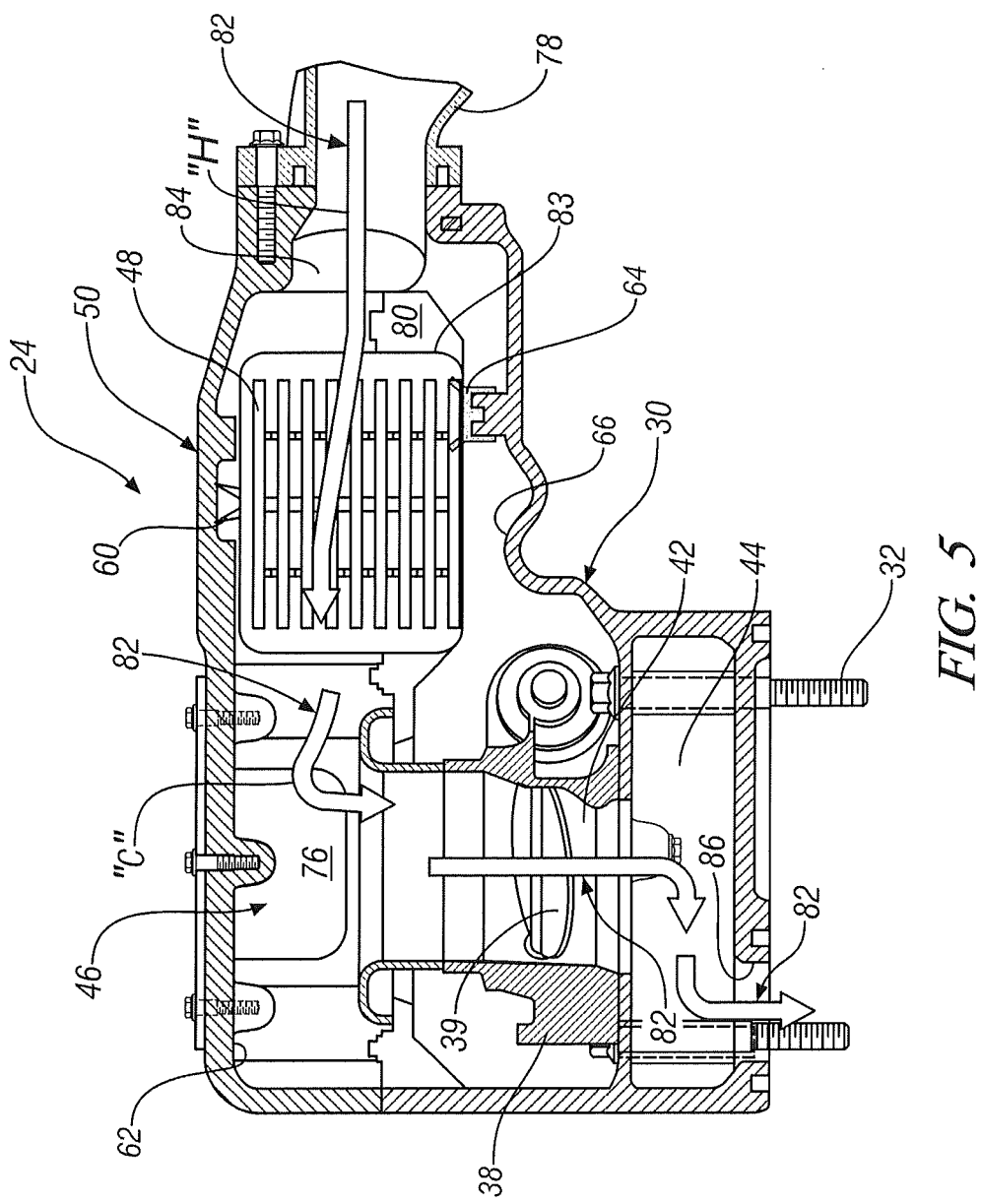
FIG. 5 is a sectional view of another embodiment of the integrated airflow cooler module of FIG. 2.

While the invention had been described thus far as applicable to a V-configured internal combustion engine 10 having twin, exhaust driven turbochargers 22, it is contemplated that the invention has equally beneficial application to internal combustion engines of other configurations. Such configurations may include V-configured engines having a single exhaust driven turbocharger or an engine driven supercharger in which case the configuration of the IACM may only, but not necessarily, require a single heat exchanger 48 and a single combustion air inlet 84. As illustrated in FIG. 5, an IACM 24 is illustrated for application to such an engine. In the exemplary embodiment, an upper manifold assembly 50 and lower manifold assembly 30 define a single combustion air inlet 84 through which hot combustion air "H" from one or more exhaust driven turbochargers enters the IACM 24 via a single combustion air conduit 78. The combustion air inlet 84 is in fluid communication with outer chamber or plenum 80, defined upstream of a single heat exchanger 48, that operates to receive the hot compressed combustion air "H". The hot compressed combustion air "H" is distributed within the plenum 80, across the upstream face 83 of the heat exchanger 48. Hot compressed combustion air "H" flows from the plenum 80 through the heat exchanger 48 where it is cooled before entering the upper manifold volume 76 as cooled compressed combustion air "C". The cooled compressed combustion air "C" is metered by the throttle blade 39 of the throttle body 38 as it flows from the upper manifold volume 76 to the lower manifold volume 44 where it exits the IACM 24, through combustion air outlets 86, and enters the valved intake ports 16 of the internal combustion engine 12 for mixing with fuel and combustion thereof in the combustion chambers 14.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An air intake system for delivering combustion air to a cylinder head of an internal combustion engine, the air intake system including an integrated airflow cooler module comprising:
   a lower manifold assembly mountable to the cylinder head, the lower manifold assembly comprising a housing that defines a lower manifold volume therein;
   an upper manifold assembly comprising a housing that defines an upper manifold volume therein, the upper manifold assembly mounted to the lower manifold assembly to define an enclosed manifold volume therebetween that includes the upper and lower manifold volumes;
   a throttle body disposed within the enclosed manifold volume between the upper manifold volume and the lower manifold volume;
   a throttle blade disposed in the throttle body to meter combustion air through the integrated airflow cooler module from the upper manifold volume to the lower manifold volume;
   a heat exchanger disposed in the upper manifold volume between a combustion air inlet of the integrated airflow cooler module and the throttle body, wherein a combustion air flow path extends from the combustion air inlet into the upper manifold volume, through the heat exchanger and the throttle body and to a cylinder head of the internal combustion engine; and
   a first seal disposed between the heat exchanger and an inner wall of the upper manifold housing and a second seal disposed between the heat exchanger and an inner wall of the lower manifold housing, to prevent hot combustion air entering the integrated airflow cooler module from bypassing the heat exchanger and entering the throttle body.

2. The air intake system of claim 1, further comprising a combustion air conduit in fluid communication with the combustion air inlet and configured to deliver combustion air from an exhaust driven turbocharger to the integrated airflow cooler module.

3. The air intake system of claim 1, further comprising a plenum disposed between the combustion air inlet and an upstream face of the heat exchanger.

4. The air intake system of claim 1, further comprising:
   a second heat exchanger disposed in the upper manifold volume between a second combustion air inlet of the integrated airflow cooler module and the throttle body, wherein a combustion air flow path extends from the second combustion air inlet into the upper manifold volume, through the second heat exchanger and the throttle body and to the cylinder head of the internal combustion engine.

5. The air intake system of claim 4, wherein the first and second heat exchangers are disposed in the same manifold volume.

6. The air intake system of claim 4, wherein the combustion air inlet comprises opposed first and second combustion air inlets, the first heat exchanger positioned proximate the first combustion air inlet such that compressed combustion air passing through the first combustion air inlet passes through the first heat exchanger prior to passing through the throttle body, and the second heat exchanger positioned proximate the second combustion air inlet such that compressed combustion air passing through the second combustion air inlet passes through the second heat exchanger prior to passing through the throttle body.

7. The air intake system of claim 1, wherein the upper manifold comprises a first perimeter flange and the lower manifold housing comprises a second perimeter flange, and wherein a gasket is coupled directly between the first and second perimeter flanges.

8. The air intake system of claim 1, further comprising a manifold absolute pressure sensor mounted to the lower manifold assembly.

9. The air intake system of claim 8, wherein the lower manifold assembly includes a positive crankcase ventilation system conduit port.

10. The air intake system of claim 9, further comprising a water manifold coupled to the upper manifold assembly and fluidly coupled to the heat exchanger.

11. The air intake system of 1, wherein the heat exchanger comprises a pair of spaced headers and a plurality of fluid tubes extending therebetween.

12. The air intake system of claim 11, further comprising a plurality of brackets coupled to the spaced headers, wherein the brackets are directly coupled to the upper manifold assembly.

13. An integrated airflow cooler module for supplying combustion air to a cylinder head of an internal combustion engine, comprising:
   a lower manifold housing mountable to the cylinder head;
   an upper manifold housing configured for assembly to the lower manifold assembly to define an enclosed manifold volume therebetween;
   a throttle body fluidly disposed within the enclosed manifold volume and operable to section the enclosed manifold volume into an upper manifold volume and a lower manifold volume;
   a throttle blade disposed in the throttle body to meter combustion air through the integrated airflow cooler module from the upper manifold volume to the lower manifold volume and to intake ports of the cylinder head;
   first and second heat exchangers sealingly disposed in the upper manifold volume between an inner wall of the upper manifold housing and an inner wall of the lower manifold housing, each of the first and second heat exchangers comprising a header and a bracket coupled to the header;
   at least one fastener coupled to the bracket and the upper manifold housing to couple the first and second heat exchangers to the upper manifold housing; and
   first and second combustion air inlets in fluid communication with first and second plenums adjacent to upstream faces of the first and second heat exchangers wherein combustion air flow paths extends from the first and second combustion air inlets, through the first and second heat exchangers and the throttle body, and to the cylinder head of the internal combustion engine.

14. The integrated airflow cooler module of claim 13, further comprising combustion air conduits in fluid communication with the first and second combustion air inlets and configured to deliver combustion air from a plurality of exhaust driven turbochargers to the integrated airflow cooler module.

15. An integrated airflow cooler module for supplying combustion air to a cylinder head of an internal combustion engine, comprising:
 a lower manifold housing mountable to the cylinder head;
 an upper manifold housing mounted to the lower manifold housing to define an enclosed manifold volume therebetween;
 first and second combustion air inlets;
 a throttle body fluidly disposed within the enclosed manifold volume and operable to section the enclosed manifold volume into an upper manifold volume and a lower manifold volume;
 a throttle blade disposed in the throttle body to meter combustion air flowing through the integrated airflow cooler module from the first and second inlets to the cylinder head;
 first and second water-to-air heat exchangers that are in fluid communication with a cooling system through a water manifold, the heat exchangers disposed in the upper manifold volume between the first and second combustion air inlets and the throttle body;
 and a plurality of seals, disposed between each of the first and second heat exchangers an inner wall of the upper manifold assembly housing and an inner wall of the lower manifold housing, to prevent hot combustion air entering the integrated airflow cooler module from bypassing the heat exchangers and entering the throttle body, wherein a combustion air flow path extends from the first and second combustion air inlets, through the heat exchangers and the throttle body, and to the cylinder head.

16. The integrated airflow cooler module of claim 15, wherein the throttle body comprises a throttle bore, the throttle bore sealed to an inner wall of lower manifold housing.

* * * * *